United States Patent [19]

Aldrich et al.

[11] Patent Number: 4,943,815

[45] Date of Patent: Jul. 24, 1990

[54] LASER PRINTER WITH LIGHT-EXPOSURE PREVENTION

[75] Inventors: Charles S. Aldrich; James A. Craft; James P. Harden; Steven R. Komplin; William S. Rousey; Praful M. Shah; Earl D. Ward II; Bernard L. Wilzbach, all of Lexington; Terry L. King, Versailles, all of Ky.

[73] Assignee: International Business Machines Corporation, Armonk, N.Y.

[21] Appl. No.: 373,767

[22] Filed: Jun. 29, 1989

[51] Int. Cl.[5] ....................... G01D 15/14; G02B 26/02

[52] U.S. Cl. .................................... 346/108; 355/210; 250/515.1; 350/266

[58] Field of Search .................. 346/108, 160; 355/71, 355/210; 250/515.1; 350/266

[56] References Cited

U.S. PATENT DOCUMENTS

| | | | |
|---|---|---|---|
| 4,100,419 | 7/1978 | Pedroso | 250/514 |
| 4,135,721 | 1/1979 | Camerik | 274/1 D |
| 4,803,521 | 2/1989 | Honda | 355/210 |

OTHER PUBLICATIONS

IBM Technical Disclosure Bulletin, article entitled "Cartridge and Cover Interlock Mechanism, " vol. 31, No. 7, Dec. 1988 at pp. 336 and 335.

*Primary Examiner*—Mark J. Reinhart

*Attorney, Agent, or Firm*—John A. Brady

[57] ABSTRACT

When cover (8) of the laser printer (3) is closed, absence of the replaceable cartridge (15) or the shroud assembly (9) will activate both an electrical and a mechanical interlock. A moveable switch actuator (16) on the shroud assembly will be absent if the assembly is omitted and will not find a guide ramp (46) if the cartridge is absent, thereby assuring power to the light source remains off. A shutter (13) also blocks the normal light path and is moved aside by a pin (14) on the cartridge, and therefore blocks light unless a cartridge is installed. Walls (31) on the cartridge surround the shutter during normal use to form a protective light baffle. The laser printhead (2) is fixed within the shroud so that separation requires a necessary electrical cable (72, 74) to be disconnected.

8 Claims, 14 Drawing Sheets

LASER PRINTER WITH LIGHT-EXPOSURE PREVENTION

TECHNICAL FIELD

This invention relates to the prevention of human exposure to high-energy light by an optical printer. Such a printer comprises a laser or other source of high-energy light by which a photosensitive surface is exposed to form a temporary image, which is then transferred to paper or the like as the final image. Humans must be protected from the high energy laser light during normal use and also during maintenance or service of the printer.

BACKGROUND OF THE INVENTION

The requirement of protecting humans from the laser light or other high energy light incident to laser imaging and maintenance and service of such printers is a standard one and forms no part of this invention. Class 1 is a designation of light intensity safe to humans, and any possible exposure to a higher light intensity is broadly recognized as unacceptable. Similarly, switches which operate to provide protection when a cover is lifted or removed, are widely employed and known under the term "interlock."

U.S. Pat. No. 4,100,419 to Pedroso employs a shutter and a linkage to the shutter to protect users against exposure to laser light, but does not involve a replaceable cartridge. U.S. Pat. No. 4,135,721 to Carmerik similarly involves a shutter.

DISCLOSURE OF THE INVENTION

In accordance with this invention a laser printer has its laser mounted in a housing opaque to significant harmful light. The housing has a pivoted shutter over an aperture, biased closed. The printer has a top frame or cover which is pivoted upward during maintenance. The inside of the printer receives a cartridge having a photosensitive drum with which the light source interacts for imaging. That cartridge is replaced periodically during the useful life of the printer, and the top cover is also raised during that replacement.

An abutment on the cartridge is positioned to push a shutter control member to open the shutter when the top cover is lowered. At a different location the opaque housing carries a switch operator which is moveable by contact with the cartridge. When so moved, it activates a switch which connects electrical power to operate the electronics controlling the laser. Additionally, the cartridge has outwardly extending walls which surround a window over its drum, so that the optical path with the cartridge inserted is confined, thereby providing a light baffle. Also, the laser printhead is fixed within the housing, such that any attempt to separate the printhead requires movement necessitating disconnection of an electrical cable activating the printhead, thereby further assuring inactivation of the laser.

BRIEF DESCRIPTION OF THE DRAWING

The details of this invention will be described in connection with the accompanying drawings, in which.

BEST MODE FOR CARRYING OUT THE INVENTION

Figure 1:
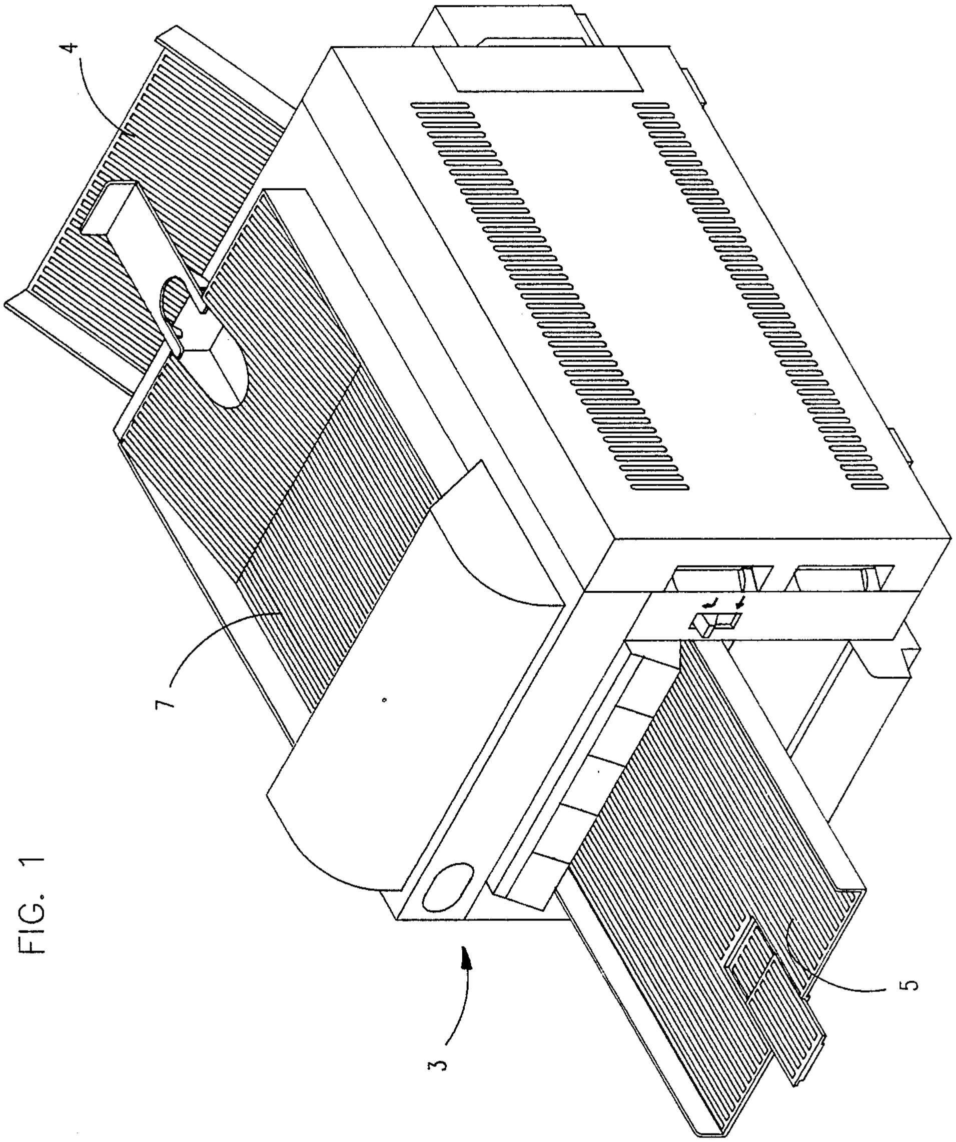
FIG. 1 is a perspective view from above of the full printer.
Figure 3:
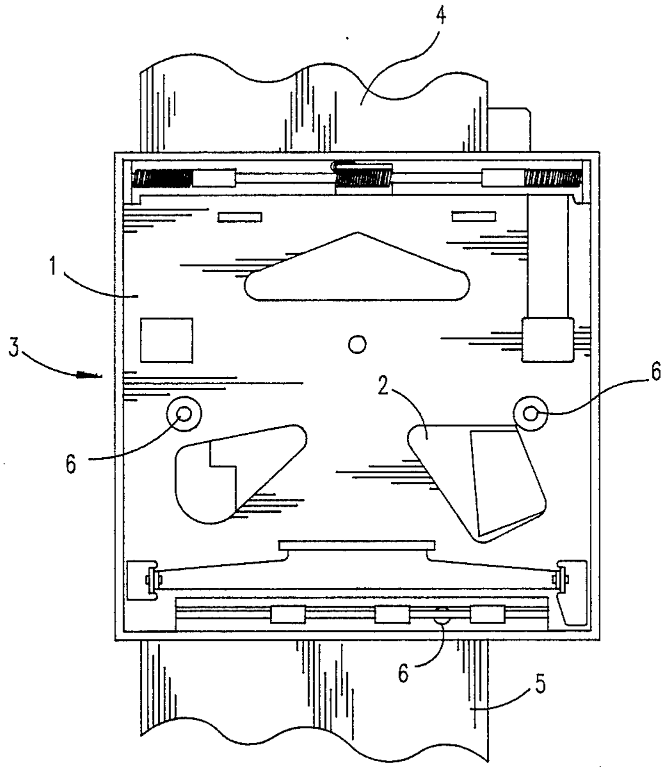
FIG. 3 is a top view of the printer with a conforming outer member removed.

FIG. 3 is a top view showing an outer, flat top frame or plate 1 revealing some of the laser printhead 2 under plate 1 in a printer 3. An outer, conforming top 7 (FIG. 1) which serves as a horizontal paper tray is not shown in FIG. 3. Paper which receives the final printing is normally stored in printer 3, but may be inserted individually from rear paper tray 4. Printer 3 has operator-selectable modes to deliver finished copies either on front tray 5 or on top tray 7 (FIG. 1).

The laser printhead 2 (comprising a laser diode and associated beam-scanning motor, mirrors and controls) is physically located inside printer 3 in such a manner that printer 3 must be significantly disassembled to gain access to the area of laser printhead 2 or to the vicinity of the output of laser printhead 2. In this disassembled state, access to light from the laser greater than a predetermined, limited amount must not reach humans. No servicing of laser printhead 2 is required; since it is replacable in a modular component. A design is considered safe to humans if any one reflection in the normal optical path would be blocked by other structure, and such blocking structure to any one reflection is achieved by this invention.

Figure 4:
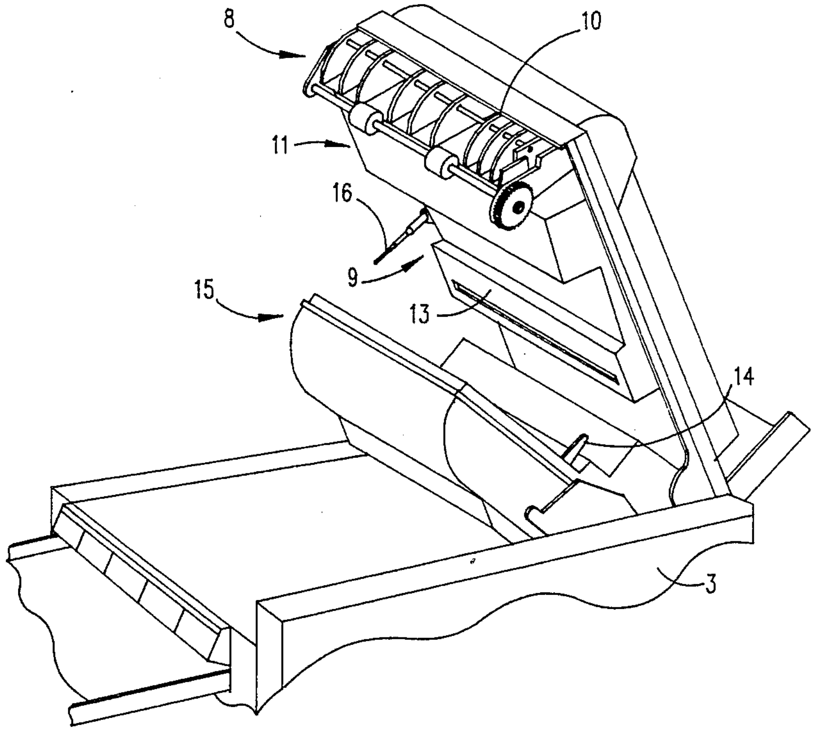
FIG. 4 is a perspective view of the printer with the cover pivoted upward for maintenance or to replace the cartridge.

FIG. 4 shows printer 3 with the top cover 8 open showing a housing or shroud assembly 9 from below. Laser printhead 2 is within shroud assembly 9, and shroud assembly 9 must first be disassembled from the printer top plate 1 (FIG. 3) to expose laser printhead 2. This requires removal of the front paper guide assembly 10 (FIG. 4), removal of a fan duct 11, and removal of the three screws 6 holding the shroud assembly 9 to top plate 1 (FIG. 3).

Printer 3 has four mechanical safeguard systems. The first is a spring loaded shutter 13 (FIG. 4), attached inside the shroud 9 and actuated by a pin 14 located on the replaceable cartridge 15. The location of this actuation pin 14 within printer 3 when cartridge 15 is installed insures that shutter 13 is actuated only if cartridge 15 is in place and machine top cover 8 is closed.

Second, laser printhead 2 can not be installed within printer 3 without shroud assembly 9 in place because shroud assembly 9 contains the receiving threads 19 (FIG. 7) necessary for bolts 6 (FIG. 3) to mount shroud assembly 9 into top mounting plate 1. Bolts 6 extend through upstanding spacers 17, which are part of printhead 2, (FIG. 5) to reach threads 19. In addition, laser printhead 2 can not be electrically energized without shroud assembly 9 in place because the push pin 16 (FIG. 4, left side) for a cover electrical interlock system, is integral with shroud assembly 9.

Figure 5:
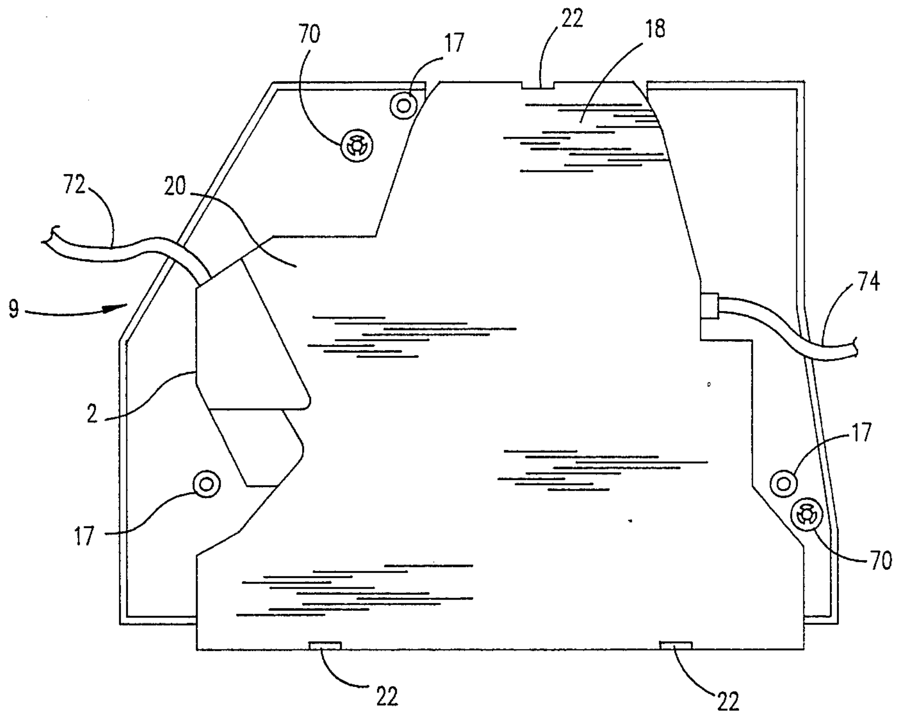
FIG. 5 is a view directly toward the inside of the housing or shroud in which a laser is mounted.

FIG. 5 is a view toward the inside of the shroud assembly 9 removed from the outer plate 1. Laser printhead 2 comprises an extensive structure under printhead cover 18 to activate a laser diode and sweep the light from the diode to using motors and mirrors, and to sense the start of sweep, all of which is essentially standard and forms no part of this invention. Light of laser printhead 2 is confined under cover 18 except for the intended light path as will be described.

Figure 14:
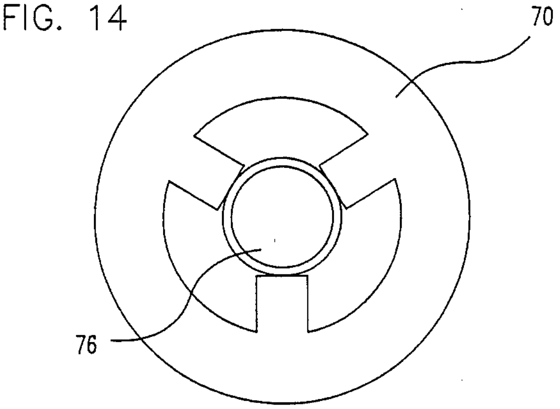
FIG. 14 is a top view of an irreversible clip used to fix the printhead to its shroud.

Third, ideally no person would attempt to separate printhead 2 from shroud assembly 9. Replacement is intended to be by replacing shroud assembly 9 containing a printhead 2. As a protection against attempts to access just the laser printhead 2, laser printhead 2 can not be removed from shroud assembly 9 without a tool because two small clips 70, each mounted on a post in shroud 9, are irreversible except by physical destruction. (Commercially available Tinnerman clips are used which employ the principle of arms positioned slightly upward so they yield when pushed downward on the post, but engage the post and hold when pulled upward. A clip 70 is shown in FIG. 14 mounted irreversibly on a post 76, an integral extension of shroud 9.)

To have space to remove clip 70 with an effective hand tool, for example, pliers, the shroud assembly 9 must be moved so far that cables 72 and 74 to laser printhead 2 are not of sufficient length to permit the movement. Cable 72 or 74 must be either disconnected or broken. Each of cables 72 and 74 provide essential electrical signals for operation of laser printhead 2. Separation of cables 72 and 74 therefore disables laser printhead 2, thus safeguarding persons against light from the printhead.

Figure 6:
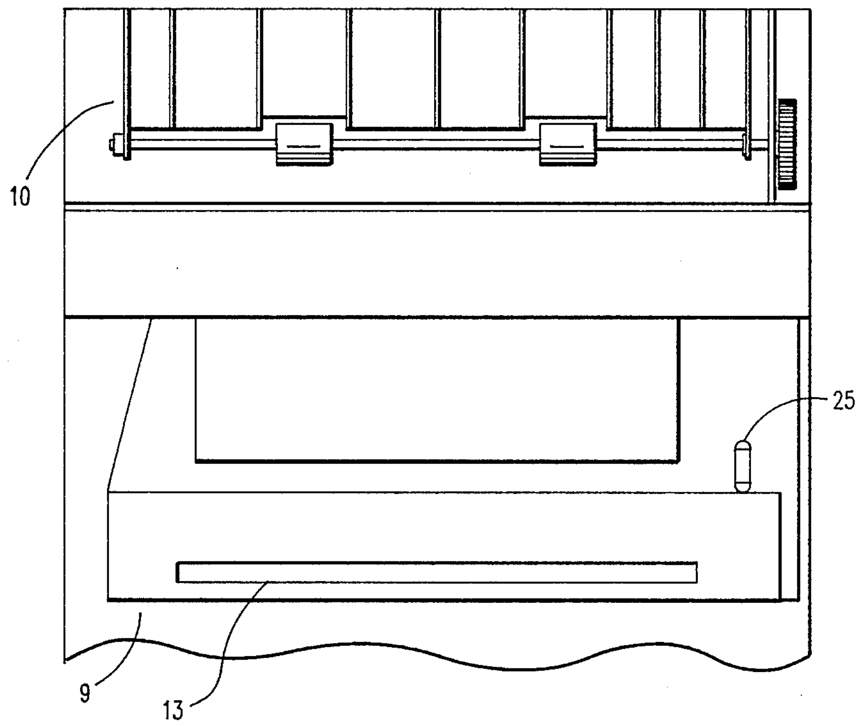
FIG. 6 is a view from the outside of the housing directly toward the shutter of the housing.
Figure 7:
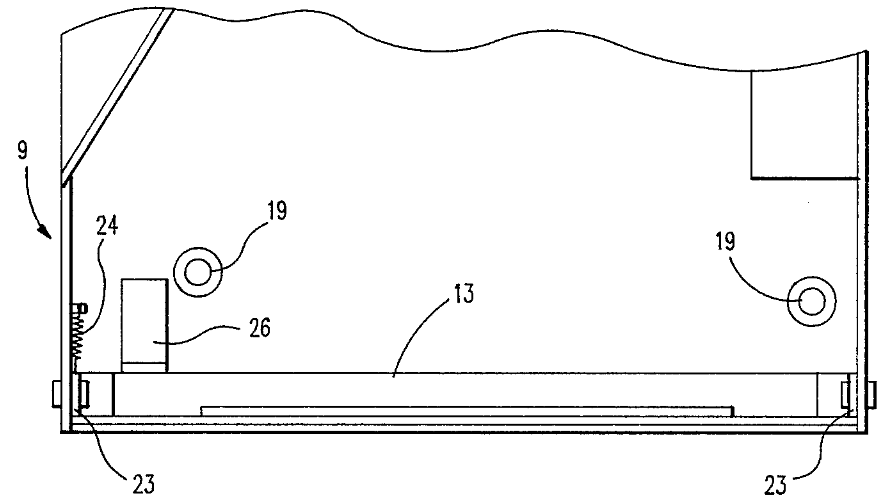
FIG. 7 is a view toward the inside of the housing with the back member and laser removed and with the shutter closed.
Figure 8:
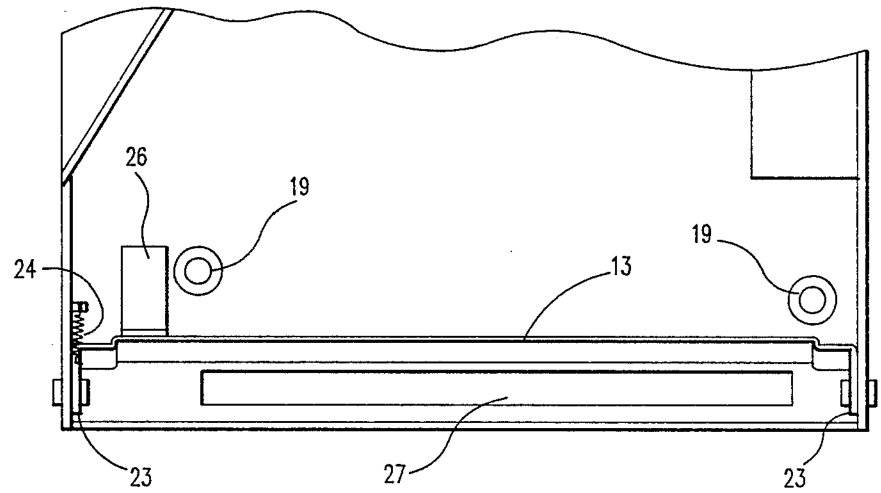
FIG. 8 is a view identical to FIG. 7 except the shutter is open.

Shutter 13 is a device mounted inside of shroud 9 on opposed pivot studs 23 which is loaded by spring 24 (FIG. 7) to remain closed when not actuated. Actuation occurs by a pin 14 (FIG. 4) on the cartridge 15 passing through an opening 25 (FIG. 6) in the shroud 9. FIG. 7 shows laser shutter 13 closed within the shroud 9 (with laser printhead 2 removed). When top cover 8 of printer 3 is closed, cartridge pin 14 enters through the shroud opening 25 to then push tab 26 which rotates shutter 13 to allow a straight path for the beam of laser printhead 2 to pass through window 27 (FIG. 8) to reach photoconductor drum 28 (FIG. 9) in cartridge 15. Shutter 13 is shown open in FIG. 8, thereby uncovering window 27.

The fourth mechanical safeguard is a baffle formed by the shroud 9 and cartridge 15. This baffle prevents any exposure to laser radiation with the cartridge installed and the machine top cover closed. This protection is available with or without the plastic machine covers in place during servicing.

Figure 9:
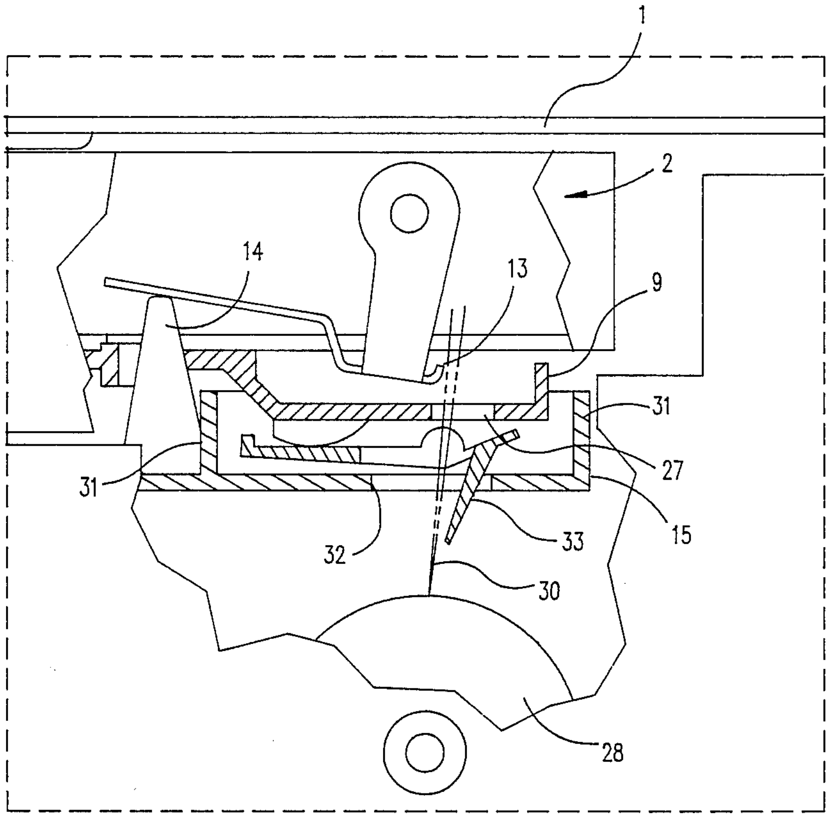
FIG. 9 is a side view showing the light path to the photoconductive drum with a cartridge inserted.

FIG. 9 is a side view illustrating this baffle showing the light path with cartridge 15 installed. The path of high energy light from laser printhead 2 is illustrated by dashed lines 30. Since cartridge 15 is installed, shutter 13 is pivoted away from window 27. Light 30 passes in a straight path from laser printhead 2 through window 27, through cartridge 15 to a window 32 in cartridge 15 on the opposite side of the cartridge from window 27. (Shutter 33 is pivoted away from window 32 as shown when cover 8 (FIG. 4) is closed.)

Figure 2:
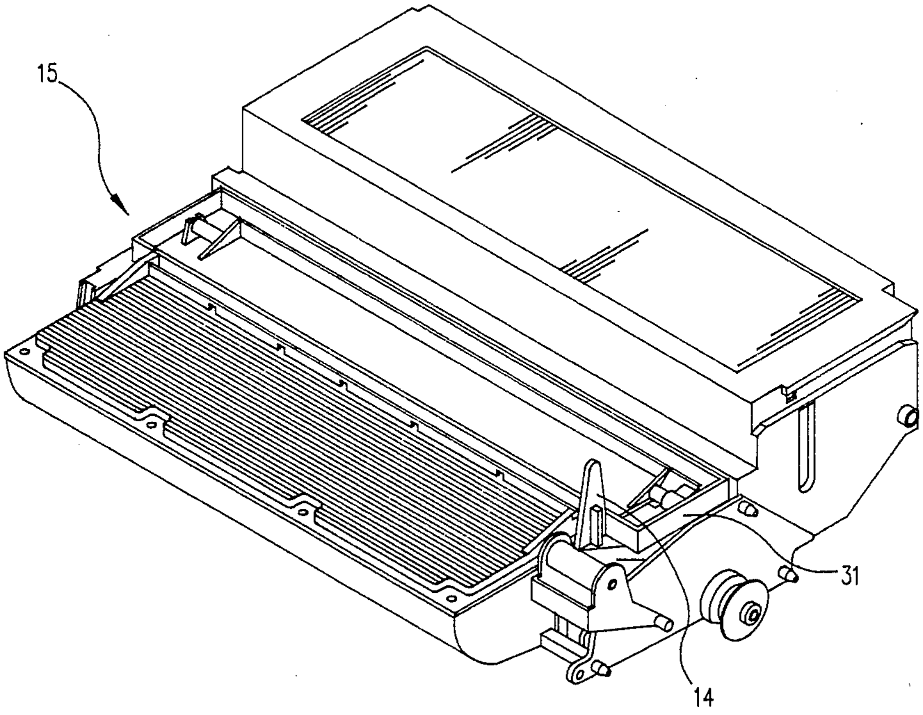
FIG. 2 is a perspective view of the cartridge from above as it would be inserted in the printer.

Shroud 9 protrudes downward near window 27. Cartridge 15 has upwardly extending walls 31 which extend past window 27. Walls 31 form a rectangle (FIG. 2) surrounding window 27. Window 32 is a rectangular opening generally similar in size to window 27, and windows 32 and 27 surrounded by walls 31 thereby form a restricted light path or baffle preventing light 30 from escaping cartridge 15. Without this, light escape might occur by inadvertent reflection induced by bumping of the printer 3. This baffle permits outer covers to be unimportant in controlling light, allowing them to be removed during servicing.

Drum 28 in this preferred embodiment is a photoconductor for xerographic imaging. Cartridge 15 preferably contains other elements for xerographic imaging, specifically toner and corona charging elements. As is conventional, a toned image is contacted with paper to receive the toner. In this preferred embodiment the paper does not enter the cartridge, and the paper is subsequently heated to fix the image. The finished paper is moved through exit sheetfeed assembly 10 (FIG. 6) to the top tray 7 (FIG. 1) of printer 3 or through similar guide structure to front exit tray 5.

Shutter 13 can only be actuated when top cover 8 is closed and cartridge 15 is in place. When top cover 8 is opened, spring 24 returns shutter 13 to the closed position. Even if spring 24 were to break, gravity will still tend to close shutter 13 in a "fail-safe" position when top cover 8 is open. If a cartridge 15 is not present, beam access is prevented because the cartridge pin 14 is not present to move shutter 13.

The top cover 8 also opens the electrical interlock system described below, preventing the laser printhead 2 from being energized. Likewise, a missing cartridge 15 also opens the electrical interlock system.

Electrical Protective Elements

Figure 10:
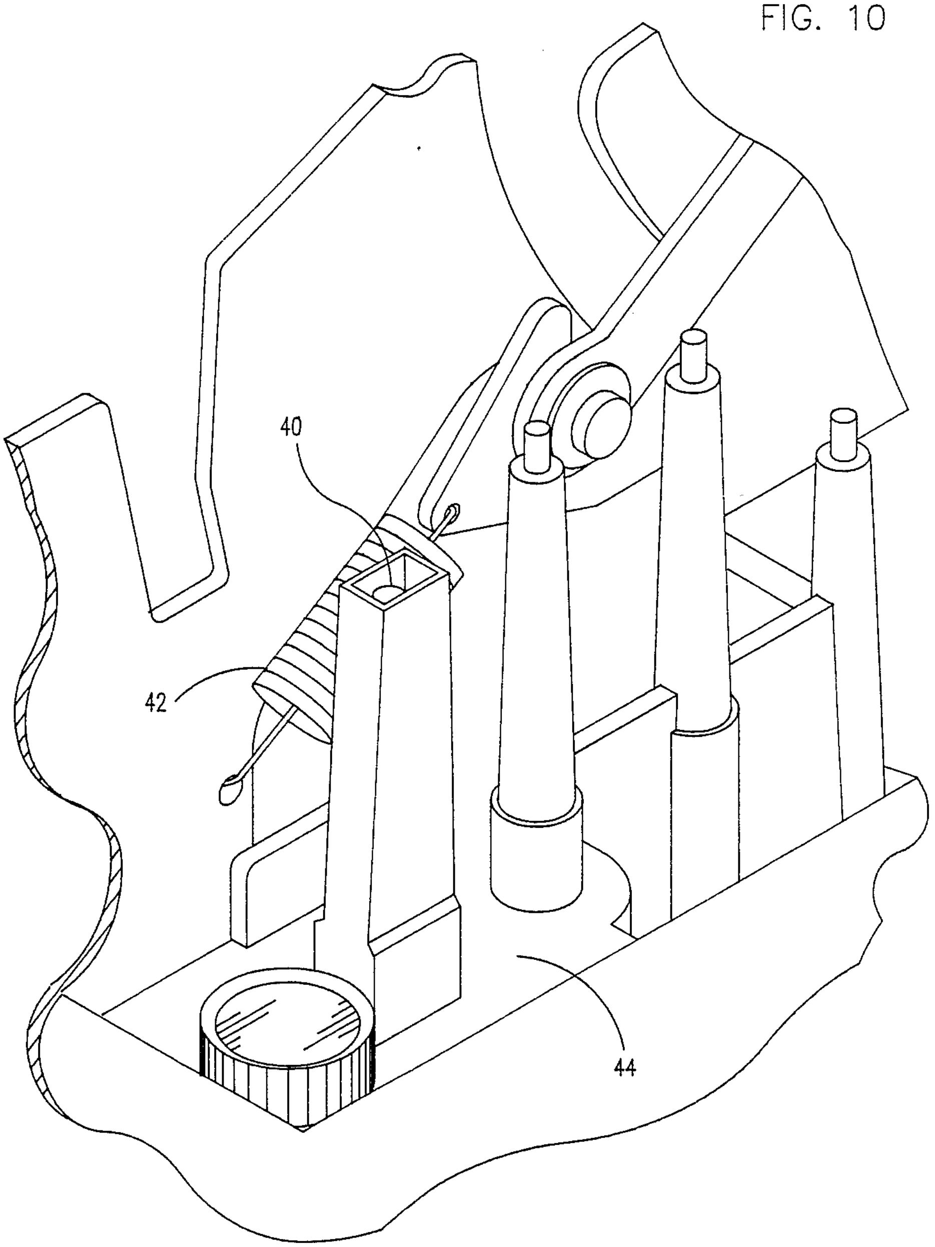
FIG. 10 is a perspective view from above showing a switch which controls power to the laser.

Electrical interlock switch 40 (FIG. 10) is operated on opening the top cover 8. Switch 40 is a mushroom shaped actuator, normally open, snap action switch with a high mechanical rated life. Switch 40 is mounted within a plastic tower 42 located in the high voltage power supply 44 at the base of printer 3. This supply 44 powers the electronics which drive laser printhead 2.

Figure 11:
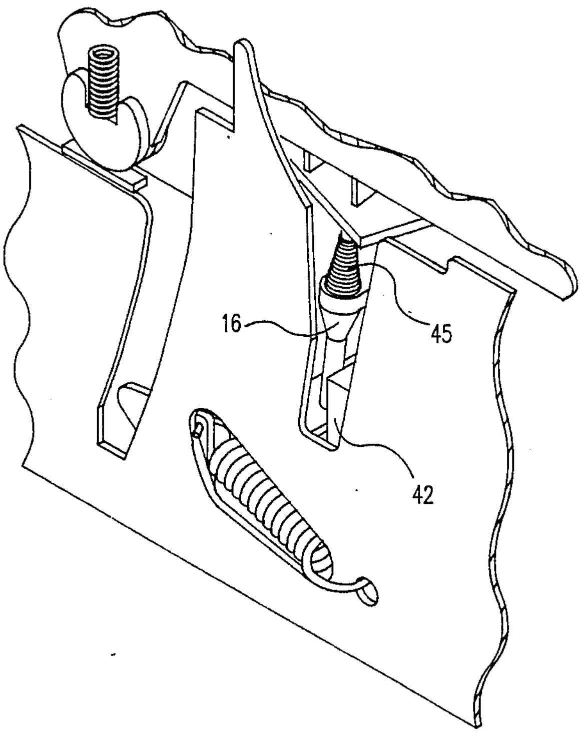
FIG. 11 is a perspective view of a switch element on the housing when the cover is closed with no cartridge inserted.
Figure 12:
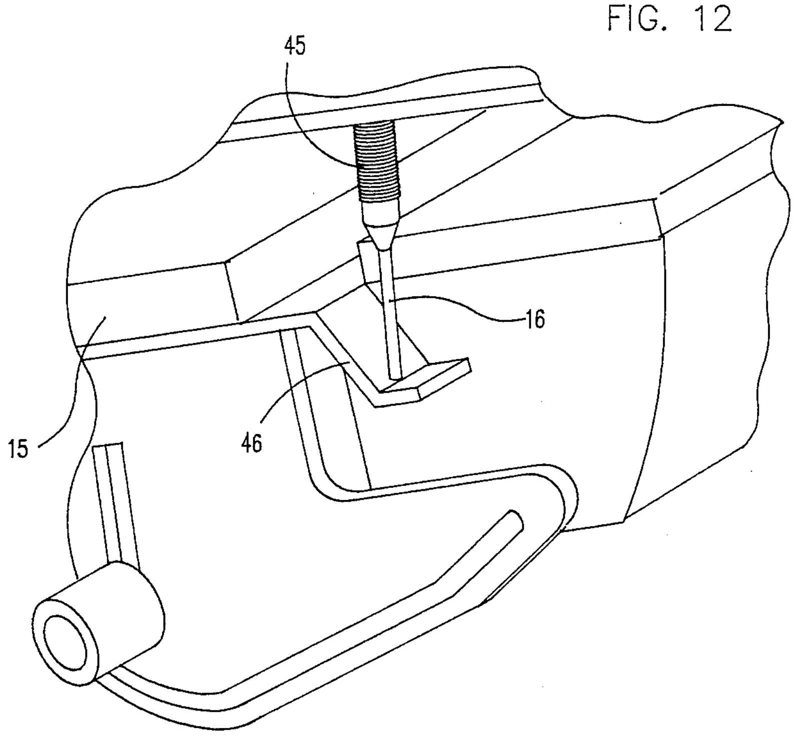
FIG. 12 is a perspective view of a switch element on the housing contacting an inserted cartridge.

Switch actuator 16 is a push pin which is yieldably suspended by a coil spring 45 from the shroud assembly 9, located in the top cover of the machine. As shown in FIG. 11, the actuator 16 misses tower 42 even though the top cover 8 is closed when no cartridge 15 is installed. Actuator 16 can only activate the electrical interlock switch 40 if a cartridge 15 is in place and the machine top cover 8 is closed. As shown in FIG. 12, cartridge 15 has a deflection ramp 46 molded as an integral part. The switch element 16, is shown as it is beginning to be deflected toward the switch tower 42 during closure of top cover 8.

Figure 13:
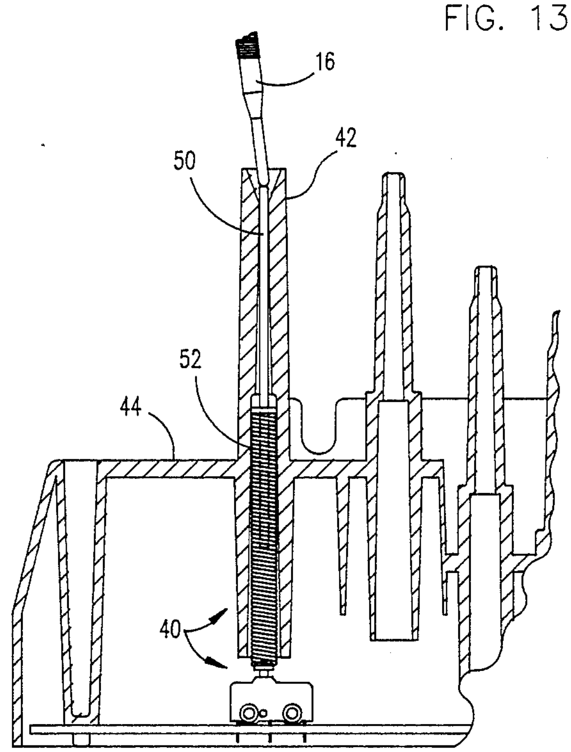
FIG. 13 is a side view in cross-section illustrating the switch element as it operates the switch.

FIG. 13 is a side view of the switch 40, having an upper extension 50, and a return spring 52, with the switch element 16 having been deflected by ramp 46 of cartridge 15 so that it has entered tower 42. Further closing of cover 8 depresses extension 50, thereby closing switch 40 to activate the power supply 44.

Thus, this electrical system is designed so that switch 40 is closed to activate the electronics for laser printhead 2 only if top cover 8 is closed and a cartridge 15 is installed in printer 3. Additionally, if during servicing the laser printhead 2 the shroud assembly 9 has inadvertently been omitted, the switch element 16 is gone, since it is integral with shroud assembly 9, and switch 40 will not be activated.

Scanning of laser printhead 2 is by a brushless DC motor which is controlled to a high speed by a phase lock loop motor control system. Motor operation is monitored and the laser printhead 2 is deactivated upon observation of failure. Such response to abnormal operation is essentially conventional and therefore not described in detail. The electronics controlling the laser printhead has various internal safety features which are commercially available and form no part of this invention.

Variations and modifications of the foregoing with the spirit and scope of this invention are intended to be within the scope of the following claims.

We claim:

1. A printer comprising a source of high-energy light, cartridge receiving means to receive a replaceable cartridge containing a drum responsive to said light to form a transferable image, means to transfer said image to a paper or other thin substrate, and means to deliver said paper or other substrate for removal from said printer, said printer preventing human exposure to said light during normal use and maintenance by said light source being enclosed in a housing substantially opaque to said light having a normally-closed shutter in optical communication with said drum and having a control member positioned to be pushed to the shutter-open position when said cartridge is in place, said housing carrying a switch element and being mounted on a pivotable top frame of said printer which is pivoted away from said cartridge receiving means for access during maintenance, a switch normally deactivating power to said light source, said switch element being moveable and being moveable to a position activating said switch by said cartridge to activate said power when said cartridge is in said cartridge receiving means and said top frame is pivoted to the position for normal use of said printer.

2. The printer as in claim 1 containing said cartridge, said cartridge having walls extending outward to surround said shutter and form a light baffle in normal use.

3. The printer as in claim 1 in which said light source is attached to said housing by at least one irreversible clip and is connected for operation by at least one electrical cable, said cable being of length that does not permit access with a hand tool to said clip for removing said clip.

4. A printer comprising a source of high-energy light, a source of electrical power to activate said source of light, a mechanical switch deactivating said source of electrical power in a first status and activating said source of electrical power in a second status, a control element for said switch, a housing in which said source of high-energy light is mounted having a window for said light and a shutter which may be moved mechanically to open said window and otherwise blocking said light, said control element being yieldably mounted on said housing, a cartridge containing printing elements positioned in said printer for printing and removable from said printer for replacement by another cartridge, a guide on said cartridge for said control element to move said control element to bring said switch to said second status and a control element on said cartridge to move said window open.

5. The printer as in claim 4 in which said cartridge has walls extending outward to surround said shutter and form a light baffle.

6. The printer as in claim 5 which said light source is attached to said housing by at least one irreversible clip and is connected for operation by at least one electrical cable, said cable being of length that does not permit access with a hand tool to said clip for removing said clip.

7. The printer as in claim 4 which said light source is attached to said housing by at least one irreversible clip and is connected for operation by at least one electrical cable, said cable being of length that does not permit access with a hand tool to said clip for removing said clip.

8. A printer comprising a source of high-energy light, a drum responsive to said light to form a transferable image, means to transfer said image to a paper or other thin substrate, and means to deliver said paper or other substrate for removal from said printer, said printer preventing human exposure to said light during normal use and maintenance by said light source being enclosed in a housing substantially opaque to said light, said light source being attached to said housing by at least one irreversible clip and being connected for operation by at least one electrical cable, said cable being of length that it does not permit access with a hand tool to said clip for removing said clip.

* * * * *